United States Patent [19]

Herregods et al.

[11] Patent Number: 5,715,382
[45] Date of Patent: Feb. 3, 1998

[54] GENERATION OF HALFTONE OVERLAYS FOR COMBINATION WITH HALFTONED IMAGES

[75] Inventors: Marc Herregods, Hever; Peter Somers, Weerde; Koenraad Van Hulle, Aartselaar, all of Belgium

[73] Assignees: Agfa-Gevaert N.V.; Xeikon N.V., both of Mortsel, Belgium

[21] Appl. No.: 641,687

[22] Filed: May 2, 1996

[30] Foreign Application Priority Data

May 5, 1995 [EP] European Pat. Off. .............. 95201167

[51] Int. Cl.$^6$ .............................................. G06K 15/00
[52] U.S. Cl. .............................................. 395/117; 395/135
[58] Field of Search ................................ 395/117, 112, 395/101, 777, 803, 133, 135, 523; 358/450, 453, 462; 348/586, 587, 588, 589, 584; 396/2-3; 345/113, 114, 115, 116, 117

[56] References Cited

U.S. PATENT DOCUMENTS

| 5,500,700 | 3/1996 | Massarsky ............................ 396/2 |
| 5,592,236 | 1/1997 | Kosenbaum et al. ............. 348/586 |

Primary Examiner—Arthur G. Evans
Attorney, Agent, or Firm—Brumbaugh, Graves, Donohue & Raymond

[57] ABSTRACT

The generation of personalised documents, or documents including variable data, may require one or more varying overlay images to be printed on top of a background image. In order to avoid the generation of the background image for each document separately, a method is provided to store the background image permanently and to merge it with the overlay images just before printing. A transparency notion may be introduced to avoid masking of the background image by horizontally oriented rectangular overlays. The overlay image and the background image may be generated by a process of multilevel halftoning, suitable for printing by an electrophotographic printing device, using colored toner.

14 Claims, 1 Drawing Sheet

GENERATION OF HALFTONE OVERLAYS FOR COMBINATION WITH HALFTONED IMAGES

FIELD OF THE INVENTION

The present invention relates to a device and a method for creating multiple documents having identical background image regions and document specific image regions containing individual data elements, originating from overlays. The method can be used in desk top publishing systems and for professional printed matter e.g. for direct mailing or personalised copies.

BACKGROUND OF THE INVENTION

For direct mailing purposes or in the production of personalised printed matter, it is necessary to print between ten and one thousand documents, having the same contents, except for a specific small area of the document. Usually, a document consists of one single sided sheet of paper, but such a document can also consist of several single sided or even double sided sheets. It is also possible that several pages of such a document must be printed or imposed on a single sheet of paper. One or more imposed sheets are then fold and/or assembled in a specific order to deliver a folder or booklet with the required layout. We will discuss here the problems that arise when individualised single sided sheets must be provided, and indicate which problems may arise from double sided printing, because the current invention also solves these problems for the more complex configurations.

The most simple format of an individualised single sided sheet comprises a general text with open spaces. This text may be printed on a paper having a specific texture or pre-printed graphics or even a faint black and white or color image as a background. In the open spaces, the specific data must be filled in per page. Traditionally, this is handled in the following way: the general text, and if applicable the graphics and faint image—together indicated further on as the background image—is printed on a plurality of sheets, which are all identical. The batch printing may be done by an offset printer, by a photocopier or by a digital printer. The page specific information can be added immediately after the first printing pass or on a later moment. This can be done per page by an individual tag stuck on the sheet, by hand writing, type-writing or by a printer coupled to a computer. Such a printer may be an impact printer, an electrographic printer, such as an electrophotographic laser printer, an inkjet printer etc. Disadvantages for this method are the conspicuous differences in writing, and between the ink of the background image and the ink of the page specific data. Moreover, the page specific text is usually not properly aligned with the background text. The second pass to add the page specific data requires extra time and an extra printing device. If the background quality must be high, offset printing is required, which is very costly for small batches of individual copies. Another important drawback of this method is that only overwriting is possible. Nothing from the background image can be locally erased. Moreover, the addition of individual pictures of halftone imagery, simulating continuous grey tone or color images is not addressed at all.

In the current digital output systems comprising a bitmap printer, for example in desktop applications, it is possible to generate a data stream for individual pages in a page description language. For each page to be printed, the data stream comprises a description of the background image and a description of the individual image. For each individual page, the data stream describing the background image and the specific data must be converted to a bitmap. If the background image is complex, this means an important burden for the raster image processor (RIP) generating the bitmap, although just a small portion on the sheet will be different from the previous sheet. Moreover, the transmission per sheet of the data stream, describing the background data, may impose a substantial reduction of performance on the total system. If the transmission goes over a network, this kind of print job imposes a tremendous load on the connection, thereby influencing the throughput of other tasks using the same network.

A method that alleviates the transmission problem is the creation of "forms". An implementation that supports the definition and use of forms is a Level 2 feature of the PostScript page description language. PostScript is a trade mark of Adobe Systems Inc. The PostScript language reference manual, 2nd edition ISBN 0-201-18127-4, chapter 4.7 on pages 172 to 175 describes the concept and the use of forms. A fixed template is defined in a form, the variable information is painted on top of it. Each execution of the form will produce the same output. The graphical output of the form is saved in a cache. Each time the form is used, the saved output may be retrieved instead of re-executing the form's definition. The manual states that this can significantly improve performance when the form is used many times. The way of caching is implementation dependent. In most implementations, the cache stores an internal representation—a display list—that is converted to a bitmap each time the form is required. Anyhow, if a form contains an image, the whole image must be cached, which requires a substantial amount of memory. Moreover, the generation of a bitmap from the display list still requires a serious amount of work.

None of the above described methods give a satisfactory solution to the problems sketched herein before, mainly due to quality problems if the overlay image or variable data field is just overprinted on the background image or master image and, in an attempt to increase quality, extra transmission time and work load for generating for each page the background image, and extra memory requirements for storage of the background image.

The prior art documents EP-A-0 243 523 and U.S. Pat. No. 4,729,037 disclose a system and a method for rendering a composite image by engraving a printing cylinder, wherein the composite image (resulting signal sequence) is a combination of a background image (first picture signal sequence) and an overlay image (second picture signal sequence). However, according to this prior art, both picture signal sequences are influenced by mask signal values, which have in the second picture signal sequence only—an analogous function as a transparency level according to the current invention. According to the table in this prior art:

- a composite data level is generated according to a spatially corresponding background data level (Data Source 1 Picture Datum) if a spatially corresponding overlay pixel is not available (i.e. Data source 2 supplies a "mask datum") ; and
- a composite data level is generated according to a spatially corresponding overlay data level (Data Source 2 picture datum) if a spatially corresponding background pixel is not available (i.e. Data source 1 supplies a "mask datum").

A problem with this prior art approach, more specifically if subsequent forms with varying data elements have to be printed, is that background data levels must be altered in order to introduce the notion of "invalid background pixels", which usually get a value of 255. If for example, a specific location of subsequent forms needs to be overwritten by subsequent family names, having a varying length, then it is difficult to predict which portions of the background image must be declared to be "invalid". Such a portion may be large enough to contain the longest name, but would be too large to contain the shortest name. To circumvent this problem, the background image should be generated again in its original form for each subsequent page, and a different set of mask signals would need to change the appropriate background pixel values. On the other hand, the necessity to provide for a "mask datum" in the background image, takes away at least one possible pixel value from the range for background data levels. This is quite important in binary (e.g. halftone) background images, for which each pixel would require two bits instead of one, or even in multilevel (halftone) background images, where one level cannot be used any more. If two bits were reserved for each background pixel, then three different levels (e.g. 0, 1 and 2) would be available for (e.g. multilevel halftoned) background image data, whereas one level (e.g. 3) would be reserved to represent the "mask datum". Without the notion of "mask datum", four levels (0, 1, 2 and 3) would be available as grey data levels. Moreover, influencing the picture signal sequence of the background image by a mask signal, requires extra computational effort. Restoration of the background image data levels may require a "decoder-step 75".

The prior art document FR-A-2 007 849 relates to multilevel halftoning in engraving a drum; GB-A-2 069 794 relates to the use of look-up tables; FR-A-2 512 221 relates to selective masks; and U.S. Pat. No. 4,680,645 relates to multilevel halftoning by varying the size of the microdots. None of these prior art documents however give a hint how to solve the above mentioned problems.

OBJECTS OF THE INVENTION

It is therefore a first object of the invention to provide a method that generates high quality pages having an identical background image and a specific image on each page.

It is a further object of the invention that each page is generated in a single print pass.

It is a specific object of the invention that the computational effort to generate pages following the first page is substantially reduced with respect to the work required to generate the page specific image region.

It is even a more specific object of the invention that the portion of the background image, which is affected by document specific data, is controllable to a substantial extent.

It is a further object of the invention that no excessively extra memory is required, and substantially no density or spatial resolution nor any portion of the achievable density range, for image data in background or document specific data, is lost.

It is a general object of the invention to overcome problems resulting from the prior art implementation as discussed in the last paragraph of the previous section.

Further objects and advantages of the invention will become apparent from the description hereinafter.

SUMMARY OF THE INVENTION

The above mentioned objects are realised by the method for rendering a composite image as set out in claim 1, wherein a composite data level is generated for a composite pixel according to a spatially corresponding overlay data level if the spatially corresponding overlay pixel is available. Preferred embodiments of the invention are disclosed in the dependent claims.

By modification of the condition to select an overlay data level from the non-availability of a background pixel as in the prior art, to the availability of an overlay pixel as in the current invention the need to modify the background image data levels is removed. Problems recited in conjunction with U.S. Pat. No. 4,729,037 are also solved.

In a preferred embodiment, the overlay image further comprises overlay pixels having a transparency level, for showing the background even where overlay pixels are available. The method according to the current invention is well suited in combination with multilevel halftoned background images and/or overlay images, since the selection operation based on availability only requires no extra data level from the background image nor from the overlay image. The notion of availability may be realised by an extra bitmap as large as the background image, to indicate where the overlay pixels have to replace the background pixels. More preferentially, this notion is realised by address circuitry which defines, preferentially for each rectangular portion within the background image to be overwritten by overlay pixels, at least two locations of opposite corner points of the rectangular portion. For example, the pixel coordinates $(X_{TL}, Y_{TL})$ of the top-left corner of the rectangular portion may be given, along with the pixel coordinates $(X_{BR}, Y_{BR})$ of the bottom-right corner.

In order not to sacrifice too much levels to the notion of transparency, within the overlay image, preferentially just one transparency level is reserved for this option.

DETAILED DESCRIPTION OF THE INVENTION

Figure 1:
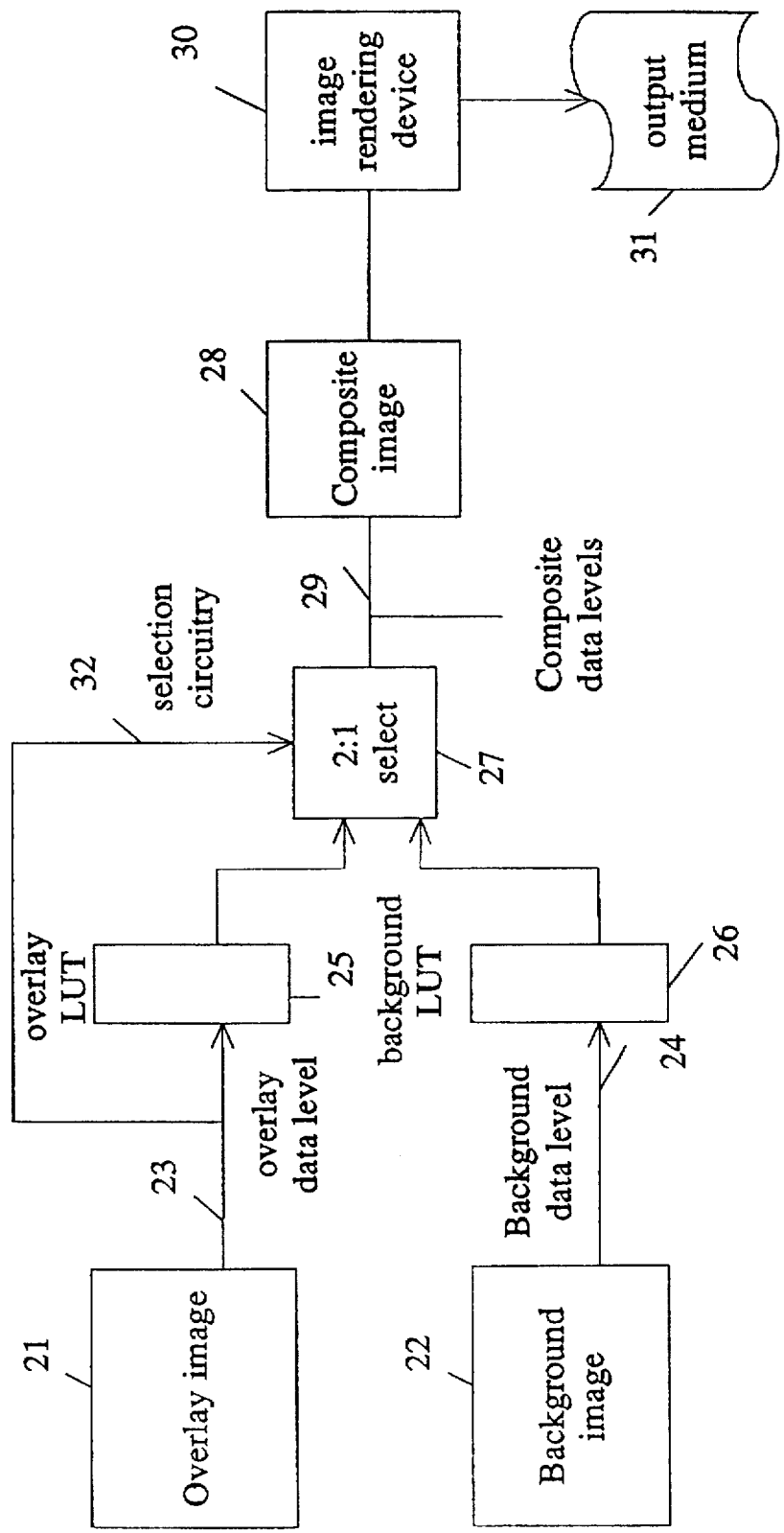
FIG. 1 shows a block diagram for a system for carrying out the method according to the current invention.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appending claims.

The method according to the current invention may be successfully implemented on a Chromapress system (trade name). Such a system—marketed by Agfa-Gevaert N. V. in Mortsel—offers different capabilities to generate consecutive sheets having page specific image regions. This system can print a thousand A3-sized paper copies per hour in duplex mode, at a spatial resolution of 600 dots per inch or about 24 pixels per mm. Four different colors can be printed on top of each other, usually cyan, magenta, yellow and black. For each color on each side of the printed sheet one color component of the background image or overlay image—as described below—is required. One color component of the background image will equally be referred to as background image. The same applies for the overlay image. For each pixel, each color can be modulated by 64 density levels. The system comprises a raster image processor and a print engine or image rendering device 30, as shown in FIG. 1. The print engine 30 comprises a bitmap memory means 22 for storing a bitmap per color, representing an A3-sized image to be printed on the paper. Each pixel requires six or four bits per color in the bitmap. Apart from the bitmap memory means, the printing device comprises an overlay memory means 21 of nine megabyte per color component. Different portions of this amount of memory can be assigned to correspond to sixteen horizontally oriented rectangular regions in the bitmap memory. The location within the bitmap memory 21, along with the vertical and horizontal size of the rectangular area can be freely chosen for each of these sixteen overlay memory portions. Each time when the bitmap memory means is read out, to provide composite data level signals 29 for the marking engine 30 modulating the density level of each pixel or microdot, said signal 29 is a combination of the bitmap or background memory contents 22 and the contents of a portion of the overlay memory 21, allocated to that pixel. The combination can be a bitwise or, a sum, a replacement of the background data level or background data signal 24 by the overlay data level or overlay data signal 23 etc. This system has an advantage over a system described in EP-A-0 703 524. The advantage may be summarised by the fact that the background memory contents must not be saved for page specific image regions and must not be restored each time a sheet is printed. Moreover, in the method according to the current invention, if eight or less page specific image regions are present in the background image, the overlay image data 21 may be accessed in ping-pong mode. This means that the overlay memory means 21 is divided in two portions. The first portion is first filled with page specific image information or overlay pixel levels 23 for the first sheet, and once the printing starts, first combined with the background data levels 24 to be sent to the marking engine. During this operation, the second portion is filled with page specific image information or overlay pixel levels for the second sheet, which is then accessed when the second sheet is printed. During the second sheet print operation, the overlay data for the third sheet are generated in the first portion of the overlay memory means, etc. This way, the page specific image bitmap generation can keep up with the printing speed.

The workflow to operate the Chromapress printer in this mode is as follows. First a "header" is transmitted to the printer engine, defining the identification and attributes of the overlay image regions required, which may comprise: their size, their location with respect to the background image, the color, the colorant for each color component, the color model if applicable and the location on the front side or back side of the page. The background image may have been generated by application programs such as Quark Express or Aldus PageMaker (trade mark Aldus Inc).

There after, the master page or background image for front side and back side, if applicable, is transmitted to the master bitmap or background image memory means of the printing device. Once the background image is stored, preferentially a header is transmitted, giving attributes for the overlay images. Such attributes may include the number of bits per pixel of the contone overlay image, the number of bits per pixel required for the multilevel halftoned overlay image, the overlay look up table contents per colorant or color component if applicable, specific pixel tone curves to be used for multilevel halftoning the overlay images, as described in EP-A-0 634 862. The subsection parameters for generating the correct sized overlay image may also be given. The overlay images may be generated by application programs such as FileMaker Pro (trade mark of Claris Inc) or Quark Express. Usually, they generate a description of images on an A4 sized page. The real contone overlay image is then put preferentially in the lower left corner of the page, where the coordinate values are (0,0) and the process for generating the overlay images takes the appropriate subsection or spatial portion from that layout. The page generated by the application program is thus clipped to the real size which is required on the output medium. After clipping, the correct translation for the overlay image is identified, with respect to the background image, in order to put the overlay image at the correct location within the background image.

After the header is transmitted, the first overlay image(s) for front side and back side may be transmitted to the overlay image memory means. Once stored, the print engine may be started, and the overlay image for the second overlay image may be transmitted simultaneously (ping-pong mode). A "tower screening" technique, as disclosed in EP-A-0 634 862 may be used to generate multilevel halftone images. The storage of one pixel tone curve per microdot gives enough flexibility to apply the method according to the current invention.

The output data stream for such a type of printer can be generated from a first data file, describing the background image, preferentially in a page description language such as AgfaScript (AgfaScript is a trade name of Agfa-Gevaert N. V. in Mortsel) and one or more subsequent data files, describing the page specific images or overlay images. How these data files may be generated in a page description language, and converted by a language interpreter to a background image and an overlay image respectively, is described in more detail in the above mentioned European Patent Application.

The system may be used for one background image on one side of each printed sheet, or for two background images, each on one side of the printed sheet. More than one page specific image region per sheet may be defined and the data file for the background image may be submitted to imposition processing prior to conversion to a suitable bitmap. For imposition, OPI comment techniques as described in the above mentioned application EP-A-0 703 524 may be used. Imposition is done on the background image only. The overlay images need no special processing, except for possible orthogonal rotation and translation to the correct position within the background image. The rotation is preferentially performed within the raster image processor (RIP), converting a page description language data stream to a bitmap. A dummy image is generated on the locations of the background image where the overlay image has to be put, or the background image is left unchanged on these locations, if transparency will be used. The overlay images will be generated at the correct size and resolution as indicated by the locations (mostly rectangular boxes, which may have an arbitrary orientation on the background image) on the background image. The imposition usually does not change the resolution or size of the overlay images, except for an orthogonal rotation (0°, 90°, 180°, 270°), and translation which may be required for correct imposition. If the OPI rectangle is rotated, an enclosing horizontally oriented rectangle is generated, which suits for the overlay image memory means.

The Chromapress system, which is an electrophotographic printer device, thus offers the possibility to keep a fixed background image 22 in a large bitmap and to substitute the data of the background image 22 by the data of an overlay image 21, that may vary from page to page. This enables fast changes of the data per printed copy, avoiding a heavy transmission load. Both the overlay image 21 and the background image 22 are preferentially bitmap representations of the composite image 28 to be rendered on the output medium 31. The output medium may be transparent or opaque photographic film, plain paper or paper especially suited for rendering images by the image rendering device 30. The output medium 31 may also be a color video display monitor, on which the composite image is made visible by varying intensities of light beams. According to the composite data levels, the optical density on the output medium is locally set, in order to visualise the composite image. The conversion of composite data levels to varying densities may be done by exposing photographic material to a light beam of varying intensity, according to the composite data levels, and subsequent developing. In an electrophotographic process, a semi conductor drum may be exposed by a varying light beam in order to vary locally the electrostatic load on the drum, followed by a step of toner application according to the electrostatic load and subsequent transfer of the toner image to the output medium, which may be paper.

The background image is preferentially in bitmap format, which means that a rectangular array of background pixels is defined at a specific resolution. This resolution is related to the image on the output medium, and is expressed in pixels per inch. In a preferred embodiment the background image pixels have the same resolution as the spatial resolution of the image rendering device 30. That spatial resolution, usually expressed in (micro) dots per inch (dpi) is given by the number of locations (called microdots) that may be addressed individually by the image rendering device to set its local density on the output medium. As said before, the spatial resolution of the Chromapress system is 600 dpi. Thus, in a preferred embodiment, the resolution of the background image is also 600 pixels per inch, such that each microdot on the output medium 31 corresponds to one pixel in the background image 22, such one pixel further on being called a background pixel. Each such background pixel has a value assigned, which corresponds to the required optical density of the corresponding microdot on the output medium. Such a value is further referred to as a background data level. If the image rendering device 30 is a binary system, capable of printing only two density levels by depositing on a microdot ink (toner) or no ink (toner), it is sufficient for each background pixel to get two different background data levels, which may be represented by one bit. The ink or toner may be black, cyan, magenta, yellow or any other suitable chromatic colorant. If the device is a multilevel system, meaning that the optical density of each microdot may be varied according to a restricted number of data levels, such that there is some perceptible quantisation of densities, then each pixel can take more than two data levels. In a preferred embodiment, each background pixel can take sixteen different data levels, ranging from 0 to 15, which may be represented by a nibble of four bits per background pixel. Usually a contone background image is delivered by a page layout system, such as Photoshop (trade name of Adobe Inc). How such a contone background image is converted by multilevel halftoning to a background image, may be found in EP-A-0 634 862. In another embodiment, as described in WO 95/02938, a contone background image may be converted by multilevel halftoning to a background image 22 represented by two bits per pixel per color. Also multilevel halftoning to six bits per pixel is a suitable solution. Alternatively, the background image may be a contone image, which is a class of imagery containing multiple density levels with no perceptible quantisation to them. In that case, usually eight bits per color are necessary. The number of different background data levels is also referred to as the "density resolution". The higher the density resolution, the lower the perceptibility of the quantisation levels.

Analogously to the background image, each overlay image 21 comprises a matrix of overlay pixels, preferentially at the same spatial resolution as the output resolution of the image rendering device 30. Alternatively, the spatial resolution of the overlay image may be half the resolution of the image rendering device, such that each overlay pixel must be repeated twice horizontally and vertically before rendering it by the image recording device 30. The same may apply to the background image. Also each overlay pixel may have an overlay data value. As will be discussed below, this overlay data level is different from an overlay transparency level, which may alternatively be assigned to an overlay pixel. The overlay image 21 may be a binary image, preferentially obtained by halftoning a continuous tone overlay image or by just generating graphics or line art and text. The overlay image may also be obtained from a continuous tone overlay image by multilevel halftoning. Or it may be a contone image.

As shown in FIG. 1, overlay data levels 23 are extracted from the overlay image 21, along with background data levels 24 from the background image 22. The overlay data levels are fed optionally in an overlay look up table or overlay LUT 25. The method according to the current invention however also applies to the case where the overlay data levels are fed directly into a selection unit 27, which may also be achieved by loading an identity transformation (input level j transformed to output level j) in the overlay LUT 25. In the same way, the background data level 24 from the background image 22 is fed into the background LUT 26, which feeds its output into the selection unit 27. In a first embodiment according to the current invention, the overlay image 21 replaces the background image 22 on the locations where both overlap. This means that the selection unit 27, based on the spatial location of the composite image pixel to be generated, selects a background data level 24 or an overlay data level 23, or respective levels corresponding to said data levels, due to the respective optional look up table transformations. The composite image 28 thus also comprises composite pixels, each having a composite data level. The composite data level is deduced from the background data level on those pixel locations of the background image where there is no overlap with the overlay image, or where the spatially corresponding overlay pixel is not available. At pixel locations in the composite image where the corresponding pixel of the overlay image overlaps with the corresponding pixel of the background image, the overlay data level 23 is taken, or a level corresponding to it. As such, the selection unit 27 outputs composite data levels or composite data signals 29 to the composite image 28. In a preferred embodiment, the composite image is not physically present in the printing device, but generated "on the fly". This means that background data levels and—where required overlay data levels are fed into the selection unit 27 at such a rate as to keep up with the printing speed of the image rendering device.

In the Chromapress system, the overlay image must have a horizontally oriented rectangular form, such that it inevitably masks a fixed rectangular area on each printed page. Moreover, the hardware of the system requires that this rectangular form has a specific size or a specific position with respect to the background, which may be addressed by increments of 8 or 16, 144 or 288 microdots only. If for example page specific text, generated within a rectangular bounding box within the overlay image 21, must be superimposed on a background, displaying imagery, then this imagery would disappear completely within the bounding box of the text. To solve this problem, a "transparency" notion was introduced into the Chromapress system. This electrophotographic color printer, is, as sketched above, capable to deposit on "microdots" arranged on plain paper at a resolution of 600 dpi (600 microdots per inch) varying quantities of four colored toner particles. In this system the background image may be stored in a large background bitmap having 288 megabyte of memory for storage of an A3 sized image at 600 dpi, four colors, double sided and four bits per pixel for each color.

A background pixel having a background data level 0 will generate no toner particles on the corresponding microdot. Level 1 will generate a small quantity of toner particles on a corresponding microdot, resulting in a low optical (micro) density. Operated in four bit mode, level 15 will generate a maximum quantity of toner particles for the microdot. On the other hand, a total of 9 megabyte per color and per sheet side is available for storage of one or more (up to sixteen) horizontally oriented rectangular overlay images, built up by overlay pixels having overlay data levels:

ranging from 0 to 15 if no transparency notion is used; and, from 1 to 15 if a transparency notion is used.

If no transparency notion is used, the above sketched problem arises: a rectangular portion of the background image is masked. If the transparency notion is used, the background image is preserved on all microdots that are not affected by the overlay image, i.e. where no overlap exists, or where the overlay image has an overlay transparency level of 0 for the corresponding overlay pixel. If the overlay pixel level "0" is reserved as transparency level, "low transparency" processing is used. If, in a four bit overlay system, the overlay pixel level "15" is reserved as transparency level, "high transparency" processing is used. Both alternatives are equivalent if use is made of the overlay look up table, as described in detail further on. Alternatively, more than just one transparency level may be defined for pixels in the overlay image. It is feasible to reserve e.g. the most significant bit of each overlay pixel to indicate whether or not the transparency must be applied or not. If four bits per overlay pixel are used, this would correspond to reserve levels 0 to 7 for transparency levels and levels 8 to 15 for overlay data levels. The selection circuitry 32 would then drive the selection unit 27 by the most significant bit of the overlay pixels. Alternatively, an extra bitmap, indicating transparent or not, may be reserved, in which case the overlay pixel is said to have an overlay data level if the transparency bit is off, and has an overlay transparency level if the transparency bit is on. In a most preferred embodiment however, just one overlay pixel level is reserved to represent an overlay transparency level. In such case, no extra memory means is required, with an almost invisible loss in quality of the overlay image, as will be clear from the description below. For each composite data level to be generated, there are basically three possibilities:

1. A spatially corresponding background pixel exists (as is preferentially always the case, and will not be repeated for cases 2 and 3) but a corresponding overlay pixel does not exist, because the overlay image does not overlap the background image at that location. In this case, the composite data level gets its value from the background data level, optionally transformed e.g. by a background LUT 26.

2. A corresponding overlay pixel does exist, but its level is an overlay transparency level. Also in this case, the composite data level gets its value from the spatially corresponding background data level, optionally transformed e.g. by a background LUT 26.

3. A corresponding overlay pixel does exist, and its level is an overlay data level. In this case, the overlay data level is used to generate the composite data level.

Thus, if the overlay image also comprises overlay pixels having an overlay transparency level, the transparency notion may be exploited such that the background image remains visible even through irregularly shaped portions of the overlay image.

According to the specific four bit overlay example sketched above, and without the use of an overlay LUT, whenever an overlay pixel has an overlay data level, ranging from 1 to 15, the corresponding microdot will get a quantity of toner corresponding to that overlay data level. This overlay notion makes it impossible to deposit no toner at a microdot, where the corresponding background pixel has a background data level different from 0. The best that may be achieved is to replace the background data level by an overlay pixel level of 1, but this gives at least a small quantity of toner. Even with this transparency notion, it is thus impossible to force a white overlay image on a dark background image. Moreover, to simulate continuous tone images, multilevel halftoned images are generated, either in the background bitmap 22 or in the overlay bitmap 21 or in both. Multilevel halftoning for electrophotographic devices requires stable halftone dots, surrounded by toner free areas. This is achieved by the introduction of a serious amount of background pixels having a background data level 0. If a contone overlay image would be halftoned by use of the same algorithm, also the overlay image 22 would contain a considerable amount of pixels having overlay pixel level of zero. Since this level was reserved for the transparency option, the background image would appear in its full density at locations where no toner should have been deposit. Therefore, in a preferred embodiment, the multilevel halftoning algorithm for generating the overlay image is modified such that it generates overlay data levels only. According to the above example, this means that the modified multilevel halftoning process will generate data levels ranging from 1 to 15 only, where the non-modified process generates for the background image data levels ranging from 0 to 15.

In a preferred embodiment, each subsequent overlay image 21 is generated by an initialisation step, followed by a multilevel halftoning step. In the initialisation step, at least all pixels belonging to the overlay image 21 are initialised to a transparency level. If a plurality of transparency levels have been defined, one specific transparency level may be selected to initialise the overlay image.

In a preferred embodiment, just one overlay pixel level is selected as transparency level. As in the above case, just one level is sacrificed from sixteen possible levels, such that fifteen levels are still available for reproducing contone imagery of the overlay image by a high quality multilevel halftoned image. In the "high transparency" mode, overlay pixels are initialised to e.g. level 15: in the "low transparency" mode, overlay pixels are initialised to level 0. In the case of "high transparency" mode, the overlay image is generated by multilevel halftoning, generating only pixel values from 0 to 14. For "low transparency" mode, in a preferred embodiment pixel tone curves are generated that contain values from 1 to 15 only. These pixel tone curves may be generated "off line" by a process for which the number of contone levels (e.g. 256) and the number of multilevel halftone levels (e.g. 16) must be given. In this case, one may specify that 15 levels are available. If the off-line process generates accordingly a pixel tone curve for each microdot, each pixel tone curve having 256 entries, which take a value from 0 to 14 (which are 15 different levels), then a value of 1 may be added to each level, such that the levels in each pixel tone curve range from 1 to 15. Via pixel tone curves a good control may be achieved over the halftoning process for the overlay image. Each pixel tone curve is a table, which may easily be edited off-line. Pixel tone curves are arranged in cells, and the cells are repeated over the whole output medium, such as described in EP-A-0 634 862.

The optional overlay LUT 25 then maps entry 0 to 0, and entry 14 to the maximum value 63 if the image rendering device is a six bit engine, or to the maximum value 255 if it is an eight bit engine. The other entries are mapped to output values between 0 and the maximum value. The output value of entry 15 has no meaning or is don't care. In the "low transparency" mode, overlay data levels from 1 to 15 are generated by multilevel halftoning. The overlay LUT preferentially maps entry 1 to 0 and entry 15 to the maximum value (e.g 63 or 255). The other entries are mapped to output values between 0 and the maximum value. The output value of entry 0 has no meaning. As a result, the system can make a distinction between "white" microdots that are present in a screened object within the overlay image (e.g. a 50% output value may result in 50% white microdots) and the dots where no overlay data is present in the overlay and where the background must show through.

The introduction of the overlay image, which may be merged with the larger background image, allows for printing subsequent pages with ever varying overlay areas. In a preferred embodiment, at least one overlay image changes from page to page, while the background image remains substantially the same.

As described above, the resolution of the background image 22 may be different from the intrinsic spatial resolution of the image rendering device 30, and different from the spatial resolution of the overlay image 21. In a preferred embodiment however, the resolution of the background image is the same as the resolution of the image rendering device. This way, each background pixel corresponds with just one microdot on the output medium. Due to the restricted amount of memory available for the overlay image, and also due to the transmission rate requirements in order to generate one or more new overlay images per sheet to be printed, it may be advantageous to generate the overlay image at a resolution which is two, three or even four times smaller than the resolution of the image rendering device. The memory requirements therefore decrease by a factor of four, nine or sixteen accordingly. The addressing circuit for accessing the overlay pixels must then access the same overlay pixel twice, three or four times and repeat each line in the same way whenever the overlay data levels 23 must be sent to the selection unit 27. However, if the size of the overlay images is restricted, it is preferred to generate and/or store the overlay image at the same resolution as the image rendering device. In the most preferred embodiment, the spatial resolution of the background image, the overlay image and the composite image are equal. This has the advantage that the maximum quality in resolution, offered by the printer device, may be effectively exploited.

As discussed above, the Chromapress system offers 64 data levels per color and per microdot. For reasons discussed in EP-A-0 634 862, only sixteen levels are selected, such that a continuous tone background image must be converted to a background image by a process of multilevel halftoning generating sixteen levels. It is preferred not to store the selected levels, which would require six bits per multilevel halftone pixel, but to assign the levels 0 to 15 to the output of the multilevel halftoning process, which requires four bits per pixel only. The conversion to the selected levels in the range from 0 to 63 may then be done at a later stage, even "on the fly", i.e. during the printing process. This conversion from levels in the range from 0 to 15 to selected levels in the range from 0 to 63 may be done by a background look up table 26, as sketched in FIG. 1. In a practical example, this background look up table is filled by the selected levels: 0, 8, 12, 16, 20, 24, 28, 32, 36, 40, 44, 48, 52, 56, 60, 63. The contents of this look up table may be different for different color components or for the same color component on the front and back side of the sheet. A background data level having level 0 will thus be converted to a selected level 0, level 1 will be converted to selected level 8, level 2 to 12, .... level 15 to selected level 63. This way, an important memory reduction is realised, because each background pixel requires four bits, rather than six, which are required for the image rendering device. As described in WO 95/02938, another dramatic reduction of memory requirement may be realised by selecting only four levels out of the 64 offered by the image rendering device. As such, only two bits per background pixel are required. The same can be said about the overlay image. If no transparency notion is used, the number of selected levels available is the same as sketched above. If one overlay pixel level is reserved as overlay transparency level, then fifteen levels may be selected if four bits are allocated for each overlay pixel, and three levels may be selected if two bits are allocated. It is not necessary that the number of bits allocated for each background pixel matches the number of bits allocated for each overlay pixel. The overlay image is compatible with the background image as long as the levels are of the same nature (e.g. six bit levels) or have a comparable range (e.g. [0,63]), at the input of the selection unit 27. In a preferred embodiment, where just graphics or text are required in the overlay image, the background image may be represented by four bits per pixel, the overlay image by one bit per pixel, with a transparency notion. This means that the background will always be visible, except at the locations where something has been written in the overlay image, where the background image is then replaced by the overlay image. In the one bit mode, an entire oversized A3 page (297 mm by 420 mm) can fit in the overlay memory means of 9 megabyte. In another preferred embodiment, the background image has four bits per pixel, while the overlay image has two bits per pixel, with overlay notion. As such, the overlay image portions may sum up to the surface of an A4 page (210 mm by 297 mm). This means that three overlay data levels are available to address three selected levels. The selected levels may be filled in an optional but preferred overlay look up table, which transforms the overlay data levels to selected levels in the range from 0 to 63.

If the transparency notion for the overlay image is used, and level 0 is chosen as overlay transparency level, then the overlay look up table 25 preferentially transforms the other values 1 to 15 to composite image data levels in the same range as those originating from the background image. According to the above example, where the contents of a background look up table was explicitly given, the contents of the overlay look up table may be given by: YY, 0, 8, 12, 16, 20, 25, 29, 33, 37, 42, 46, 50, 54, 59, 63. The first value YY is a don't care. Any value may be filled in there, because that value will not go to the composite image, because it resulted from an overlay transparency level. An overlay pixel value 1 will be transformed to a selected data level 0. As such, it is possible to deposit no ink or toner, even where a heavy background pixel was present. An overlay data level 2 will be transformed to a selected level 8, . . . , a level 15 to 63. As such, the full range of overlay data levels [1,15] is transformed by the overlay look up table to a range [0,63] of composite data levels, which is substantially equal to a range [0,63] of composite data levels originating form a full range of background data levels. The term "substantially equal" means that a variation of 10% in the lower and upper boundary plus or minus may be present, without losing the advantageous effect of this selection. Such a selection makes that hardly no difference can be noticed between image portions originating from the background image or from the overlay image.

The overlay images may be printed as well on the front side of a sheet as on the back side of a sheet of opaque output material, such as paper.

In a preferred embodiment, the overlay images are generated and then stored on hard disk. The hard disk is accessed, whenever an overlay image is required for printing. Due to the ping-pong mode as described above, the overlay images of subsequent pages may be fed into the memory means for the overlay image during print out of the current page. If the hard disk can not keep up with the printing speed of subsequent pages, three options are available:

1. one or more empty pages are generated after each printed page
2. data on hard disk are stored and retrieved in compressed format, and expanded during storage in the overlay memory means.
3. a dual disk system, or more generally a RAID system (disk array) may be used to double or multiply the transmission rate.

A compression ratio of 4 may be achieved by a lossless compression algorithm.

The generation of overlay images may be performed outside the printing device and simultaneously to printing. The generated overlay images may then be buffered on the hard disk, from which the overlay images are retrieved for printing. If the generation of overlay images is faster than the printing of them, the disk will get full and the generation process may be delayed until more space is available on disk. If the generation process is slower than the printing process, then preferentially enough overlay images are generated on disk before the engine starts, possibly until the disk is full, and the generation proceeds as the printing process starts.

Having described in detail preferred embodiments of the current invention, it will now be apparent to those skilled in the art that numerous modifications can be made therein without departing from the scope of the invention as defined in the following claims.

We claim:

1. A method for rendering a composite image from a background image and an overlay image, wherein:

said background image comprises background pixels, each having a background data level;

said overlay image comprises overlay pixels, each having an overlay data level;

said composite image comprises composite pixels, each having a composite data level;

comprising the steps of:

generating a composite data level for a composite pixel according to:

a spatially corresponding background data level if a spatially corresponding overlay pixel is not available; and a spatially corresponding overlay data level if available;

rendering said composite image on an output medium as varying optical densities according to said composite data levels.

2. Method according to claim 1, wherein said overlay image further comprises overlay pixels having an overlay transparency level and further comprising the step of generating a composite data level for a composite pixel according to a spatially corresponding background data level if a spatially corresponding overlay pixel is available and has an overlay transparency level.

3. Method according to claim 1, wherein said background data levels are generated by a process of multilevel halftoning.

4. Method according to claim 1, wherein said overlay data levels are generated by a process of multilevel halftoning a contone overlay image.

5. Method according to claim 4, wherein said process of multilevel halftoning a contone overlay image generates overlay data levels exclusively.

6. Method according to claim 2, wherein said overlay transparency levels are generated by initialisation of an overlay image to at least one transparency level.

7. Method according to claim 2, wherein just one value is available as overlay transparency level.

8. Method according to claim 1, wherein each generated composite image is printed on a page of an output medium, the background data levels remain substantially unchanged and the overlay data levels are changed from page to page.

9. Method according to claim 1, wherein the spatial resolution of the background image, the overlay image and the composite image are equal.

10. Method according to claim 1, wherein a background data level is transformed by a background look up table to deliver a composite data level.

11. Method according to claim 1, wherein an overlay data level is transformed by an overlay look up table to deliver a composite data level.

12. Method according to claim 11, wherein said overlay look up table transforms a full range of overlay data levels to a range of composite data levels, which is substantially equal to a range of composite data levels originating from a full range of background data levels.

13. Method according to claim 1, wherein the step of rendering is performed by an electrographic system.

14. Method according to claim 1, wherein the availability of an overlay data level is indicated by at least one rectangular portion, defined with respect to the background image, by specifying the location of at least two opposite corner points of said rectangular portion.

* * * * *